United States Patent [19]

Hartwig et al.

[11] Patent Number: 4,489,261
[45] Date of Patent: Dec. 18, 1984

[54] METHOD AND MEANS FOR FEEDING ELECTRIC ENERGY TO A PORTABLE POWER TOOL

[75] Inventors: C. Sverker M. Hartwig, Täby; Erik A. Ljung, Stockholm, both of Sweden

[73] Assignee: Atlas Copco Aktiebolag, Nacka, Sweden

[21] Appl. No.: 450,080

[22] Filed: Dec. 15, 1982

[30] Foreign Application Priority Data

Dec. 18, 1981 [CH] Switzerland ............... 8099/81

[51] Int. Cl.³ ............................................. H02P 5/40
[52] U.S. Cl. ...................................... 318/700; 318/723
[58] Field of Search ............... 318/729, 700, 799–811

[56] References Cited

U.S. PATENT DOCUMENTS

| | | | |
|---|---|---|---|
| 3,372,323 | 3/1968 | Guyeska | 318/341 |
| 3,619,749 | 10/1968 | Schieman | 318/798 |
| 4,207,510 | 6/1980 | Woodbury | 318/802 |
| 4,259,629 | 3/1981 | Kurosawa | 318/812 |
| 4,320,332 | 3/1982 | Sugimoto | 318/803 |
| 4,338,558 | 7/1982 | Okamatsu et al. | 318/802 |
| 4,394,610 | 7/1983 | Polland | 318/800 |

FOREIGN PATENT DOCUMENTS

| | | |
|---|---|---|
| 2648150 | 4/1978 | Fed. Rep. of Germany . |
| 284614 | 5/1976 | Sweden . |
| 1246970 | 12/1967 | United Kingdom . |
| 1391561 | 3/1972 | United Kingdom . |
| 1397953 | 8/1972 | United Kingdom . |
| 1404901 | 4/1973 | United Kingdom . |
| 1440609 | 9/1973 | United Kingdom . |
| 1440475 | 9/1973 | United Kingdom . |
| 1441374 | 4/1974 | United Kingdom . |

Primary Examiner—E. A. Goldberg
Assistant Examiner—A. Evans
Attorney, Agent, or Firm—Frishauf, Holtz, Goodman and Woodward

[57] ABSTRACT

A method and a means for feeding electric energy to a portable power tool is based on a principle according to which the brushless AC motor of the tool is individually supplied with power from a solid state inverter type power supply by which the amplitude and frequency of the AC current are automatically and individually adapted to the instantaneous load conditions experienced by the motor.

13 Claims, 7 Drawing Figures

METHOD AND MEANS FOR FEEDING ELECTRIC ENERGY TO A PORTABLE POWER TOOL

BACKGROUND OF THE INVENTION

The present invention relates to a method and a means for feeding electric energy to a portable power tool.

In particular, the invention concerns a method and a means for feeding energy to a portable power tool comprising a brushless electric motor.

The primary object of the invention is to accomplish an improved power-weight relationship as well as a stiffer power-speed relationship in electrically powered tools. This is achieved by automatically adapting the parameters of the supplied electric energy to the instantaneous operating conditions of the tool motor in relation to predetermined performance specifications.

Prior to this invention there have been available mainly two different types of electric tools as far as the electrically powered prime mover is concerned. One of these comprises a brush fed motor for connection to a conventional mains voltage of 50 or 60 Hz frequency. The other type comprises a brushless motor for connection to a non-variable voltage source of 150–400 Hz non-variable frequency.

The first mentioned type of tool including a brush fed mains connected motor is disadvantageous in that the brushes produce sparks which may be hazardous in inflammable or explosive atmosphere, and in that the brushes and commutator are exposed to a hard wear, especially when the tool is used in a dusty and/or corrosive atmosphere.

Concerning the operational features, the brush motor tools have by nature a high idle speed and a very weak power-speed characteristic. Lately however, tools of this type have been equipped with electronic control means by which the idle speed is reduced to a suitable level. At the same time a stronger motor has been employed such that an increased output power is obtained up to this new lower idle speed level. This means that the power-speed characteristic is improved and that the motor speed is better kept up at increasing load on the motor. Yet, the power-speed relationship is not stiff enough to satisfy heavy duty demands. In, for instance, portable grinding machine applications a loss of speed at increasing load causes a rapidly increasing wear of the grinding tool.

The brush fed motor tools are disadvantageous also in that they have a low output power-weight relationship. This means that for a given output power the weight of the tool is rather high, which of course is a serious drawback for a portable tool.

The brushless high frequency motor tools have a stiffer power-speed characteristic than the brush fed motor type tool, which means that the brushless tool better keeps up the speed at increasing motor load. The stiffer the power-speed relationship is the better from the viewpoint of tool wear as well as production rate.

Previously available brushless motor tools, however, are disadvantageous in that their power feed means provide electric energy of constant voltage and frequency. This means that due to the lack of correlation between motor load and voltage amplitude over large parts of the speed range, the energy losses are high and overheating of the motor is a serious performance limiting factor for this type of tool.

Previous brushless motor tools as disadvantageous also in that their use is limited to such areas where the non-portable high-frequency power feed means is within reach. The type of power feed means previously used in connection with portable tools is of the rotary converter type.

Such converters are not only limited to specific and predetermined voltages and frequences but have by nature a high weight-to-power ratio and are not possible to make portable. For that reason, prior art power supply means of this type are arranged to serve a number of tools through a local network, confined for instance within the premises of a factory.

The above described problems concerned with prior art technique in this field are solved by the invention as defined in the claims.

BRIEF DESCRIPTION OF THE DRAWINGS

On the accompanying drawings

DETAIL DESCRIPTION

Figure 1:
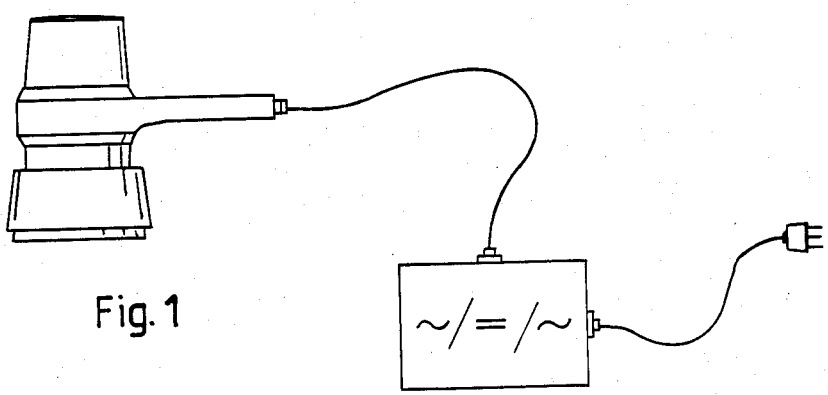
FIG. 1 shows a portable grinding machine connected to an electric power source via an inverter type feed means.

Referring to the drawing figures, the portable rotary grinding machine shown in FIG. 1 is fed with AC electric power by a supply unit including a solid state type inverter. In the latter an AC voltage of 50 or 60 HZ frequency is transformed into an AC voltage of variable amplitude and frequency,. As described in further detail below, the supply unit comprises means for sensing the actual operating conditions of the motor of the machine and to automatically adapt the voltage parameters, like amplitude and frequency, in a certain way to these conditions.

Figure 2:
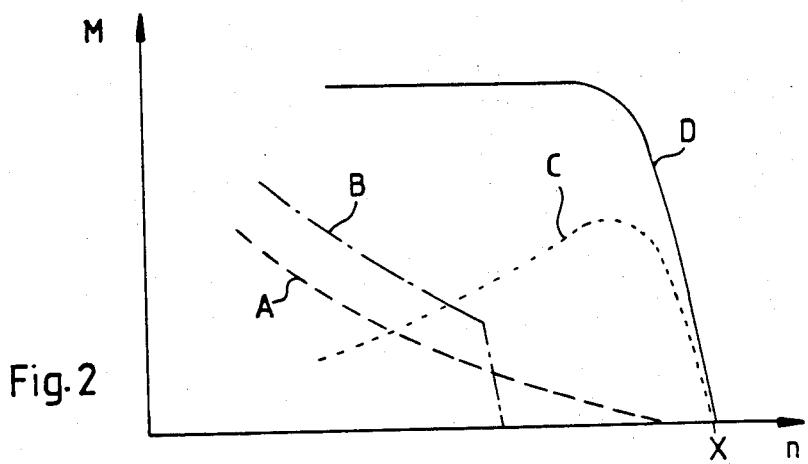
FIG. 2 shows diagrammatically the torque/speed characteristic of prior art power tool drives in comparison with the result gained by this invention.

In the chart in FIG. 2, there is illustrated the torque/speed characteristics of three different prior art electric rotary tools and a tool powered in accordance with the invention. In this chart a comparison is made between four different rotary tools all being marked with the same maximum speed. This maximum speed, which is the speed gained at idle running of the tool, is illustrated in the chart by letter X.

The dash line curve A illustrates the torque/speed relationship of a tool having a brush fed series-wound motor. This type of motor is, as previously mentioned, characterized by its low torque idle speed features. For safety reasons, however, the motor is even dimensioned so as to avoid ever reaching the maximum speed level by which the tool is marked.

Together, the maximum speed over-marking and the very weak torque/speed characteristic makes this type of tool work at a normal load speed which is 30 to 40 per cent below the stated maximum speed level. This causes an undesirably high wear of the grinding wheel which is intended to be operated at or close to the marked maximum speed level X.

The dash-dotted curve B illustrates a rotary tool of the same type as the one discussed above except for an electronic control means by which the weakest part of the torque/speed curve is "cut off". This tool is also marked with the maximum speed level X, because at a break down of the built in control means the motor speed would reach that level. So, for safety reasons, this tool always operates with an undersized grinding wheel in turn means too a low periphery velocity and cutting speed.

The result is that this electronically controlled brush fed tool has a working point at a speed level 30 to 40 per cent below the stated maximum speed level. The only difference visavi the curve A tool is that this tool (curve B) provides a higher torque at the working point speed level or a somewhat higher speed at a certain output torque. The grinding wheel consumption, though, is of the same high rate.

The dotted line curve C illustrates the torque/speed relationship of a high frequency brushless motor tool which is also mentioned above in the prior art discussion. The motor of this tool can never run faster than what is determined by the frequency of the supplied voltage, and, therefor, no safety margin is need in relation to the marked maximum speed level X.

Compared to the brush fed motor tools illustrated by the curves A and B, this tool provides a stiffer torque/speed relationship at or just below the maximum speed level. However, due to the fact that this tool is fed with a non-variable frequency voltage, the torque drops drastically as the motor speed is decreased below the maximum torque level. This means that the tool very easily get stalled with overheating as a result.

Looking now at the continuous line curve D by which the tool according to the invention is illustrated, there are four significant characteristics to be noted.

(1) No safety margin visavi the maximum speed level X is required since the motor speed is determined by the frequency of the supplied voltage.

(2) The torque/speed relationship is very stiff at or adjacent the idle speed level, which means that the tool has a working point very close to the maximum speed level. The benefit of this is a high cutting speed and a low grinding wheel consumption.

(3) The output torque remains uneffected at decreasing motor speed, which results in a very small risk of stalling and overheating the motor.

(4) The output torque is considerably higher than at the prior art tools, the brush fed motor tools in particular.

A fifth point to be noted in connection with the characteristic features of the tool according to the invention is that the weight and size of the tool, in spite of its higher performance rate, does not exceed the weight and size of any of the others.

All the above mentioned advantageous features of the tool according to the invention are accomplished by the characteristics of the method and power feed means stated in the claims.

Figure 3:
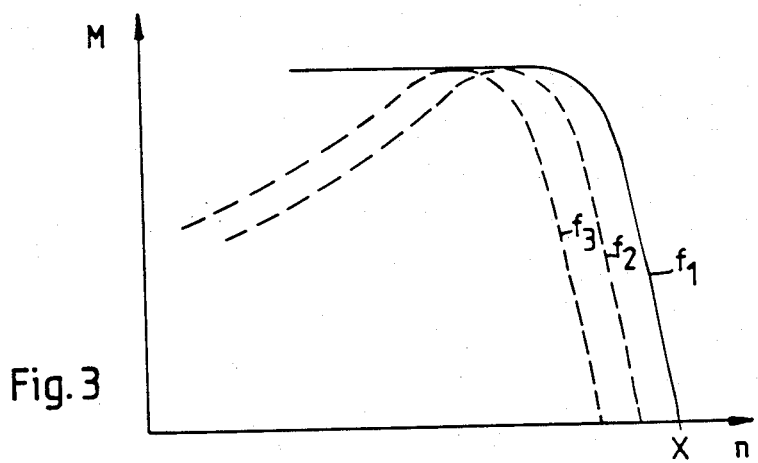
FIG. 3 shows a graph illustrating the operating characteristic of a motor fed with power in accordance with the invention.

In FIG. 3 there is illustrated how the output torque of the tool motor is kept up at decreasing motor speed as mentioned in paragraph 3 above. When the load applied on the tool reaches a certain level the speed starts falling. By successively lowering the adapting the voltage frequency to the motor speed, as illustrated by the curves $f_1$, $f_2$ and $f_3$, the output torque of the motor is maintained at its top level down the speed range. Simultaneously, energy losses are considerably reduced and so is the risk of overheating the tool.

The following discussion of the aims and advantages of a tool powered in accordance with the invention will further explain and clarify the invention step by which the method and power feed means stated in the claims distinguish over prior technique.

In accordance with the present invention, the above discussed prior problems are solved by feeding electric energy to a power tool including a brushless motor via an individual inverter means the output voltage parameters of which are automatically adjusted in a predetermined relationship to the instantaneous operating conditions of the motor.

By utilizing a power feed means including an electric inverter with variable output voltage it is made possible to automatically adjust the voltage amplitude in all different operating conditions of the motor in such a manner that the highest possible output is delivered at peak load conditions and that the smallest possible energy losses are caused over the main part of the speed range. Small energy losses are of vital interest just because they reduce the risk of overheating of the motor.

Further, the new concept according to this invention also provides for an automatic adaptation of the voltage frequency to the actual motor speed. This makes it possible not only to avoid undesirable curent peaks during starting sequences but to maintain the maximum output torque of the motor at decreasing motor speed.

Power feed means comprising solid-state electronic inverters for brushless motors are previously known per se, see for instance "Solid-State Control of Electric Drives" by R. G. Shieman, E. A. Wilkes and H. E. Jordan, published in Prodeedings of the IEEE, Vol 62, No 12, December 1974. Inverter type power feed means, however, have not previously been used in connection with portable power tools which in fact is a very special technical field from the viewpoint of load characteristic and performance requirements. Instead, inverter type power feed means for brushless motors have been described either generally or in stationary machine applications where the requirements are to obtain a free choice of motor speed levels by changing the frequency and/or to bring down expensive energy losses under various motor load conditions, for instance during starting-up sequences.

Such known applications are totally different from the portable tool application according to this invention. In the latter, the primary object of utilizing an inverter feed means is not to accomplish more than one speed level and not to bring down high energy costs as in big stationary machinery.

Instead, the possibility to change rapidly the output voltage amplitude provided by the inverter feed means is now utilized to squeeze out the maximum power capacity of a motor of a given size. Due to the fact that the output power of the motor is square related to the voltage amplitude a drastic increase in the motor output power is obtained by raising the voltage amplitude by several times as the motor load is increased from idle level to peak level.

This is a new and efficient means to obtain a very stiff power-speed relationship of the motor. At for instance portable grinding tools in which there is a very frequent motor load variation between the zero and maximum levels a rapid change in the voltage amplitude results in a tool characteristic of a high power-weight ratio as well as a very stiff power-speed relationship.

The variable frequency feature of the electronic inverter type of power feed means adds the advantage of maintaining the motor torque at a peak level when too a heavy load makes the motor speed go down. This is an essential feature in the portable tool application only, because no other type of machinery previously mentioned in connection with inverter type power feed means has a performance specification according to which the motor is frequently overloaded and sometimes stalled under normal operation. A fully maintained output torque at decreasing motor speed, though, is an important feature since it prevents a lot of unnecessary stall interruptions of the tool operation.

Utilizing the electronic inverter type power feed means for portable power tools also means that the power tools not necessarily have to be limited in use in respect of a local power distribution net. Recent development in semiconductors makes it possible to bring down the size and weight of the electronic inverter type power feed means, which means that the latter may be made portable together with the tool as a separate or built-in unit. This means in turn that the field of use of brushless high-frequency power tools may be greatly widened from a very restricted area covered by a local power net to all the places where the public 50 or 60 Hz voltage net is available.

Figure 4:
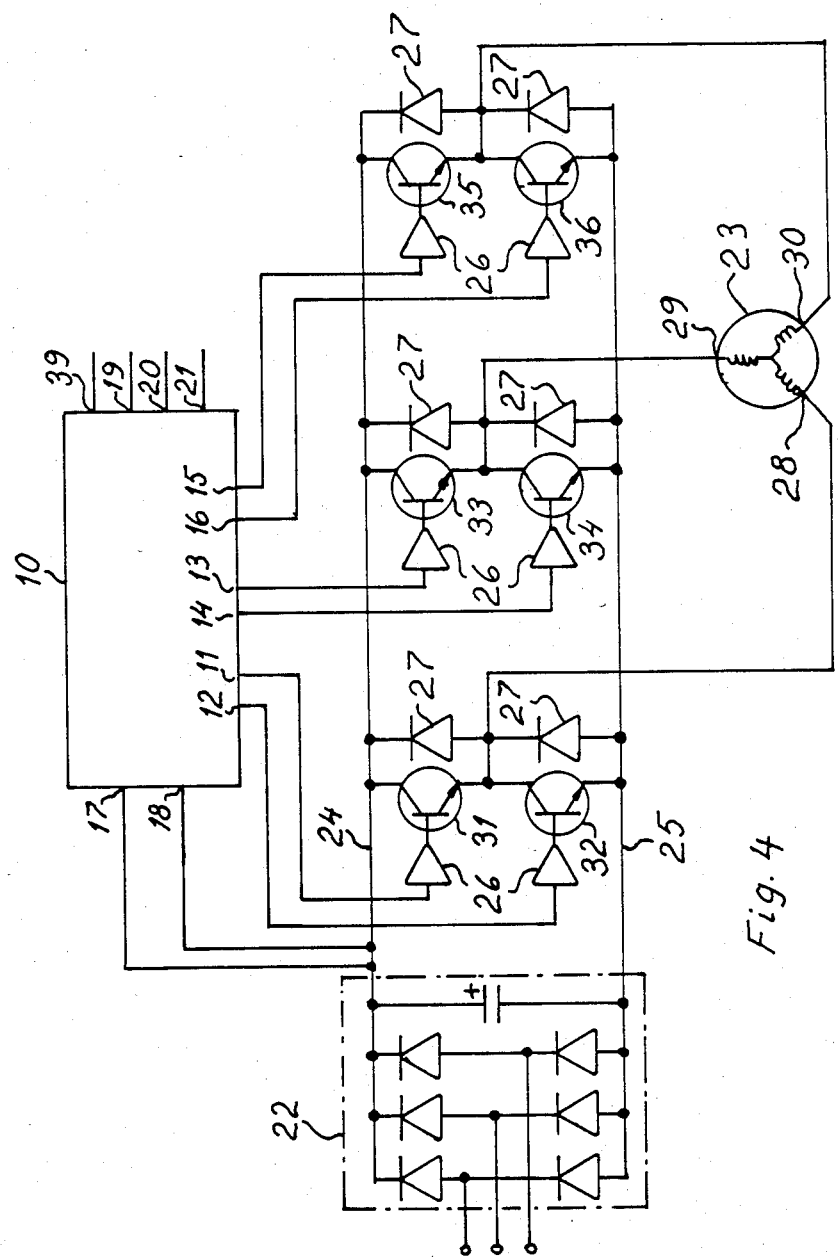
FIG. 4 shows the power supply unit.
Figure 5:
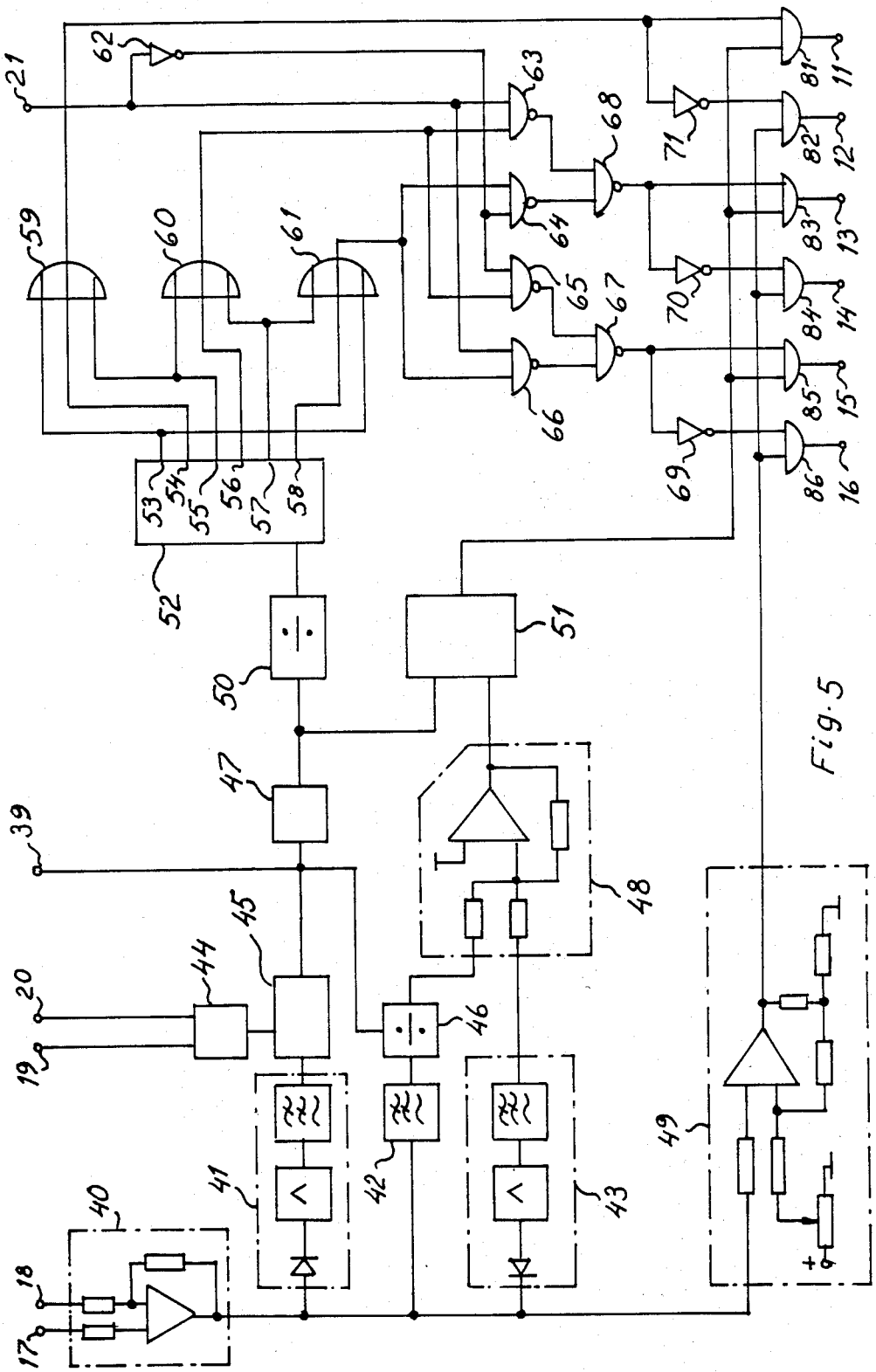
FIG. 5 shows the controller of FIG. 4.

The power supply unit which is schematically illustrated in FIGS. 1 and 4 comprises a three-phase rectifier 22 which is connected to a standard fixed frequency mains supply. The rectifier delivers direct current of substantially constant voltage to conduits 24, 25, which constitute a positive 24 and a negative 25 terminal of a direct current supply for an inverter. The inverter comprises six switching elements 31–36 for successively connecting motor terminals 28, 29, 30 on a brushless alternating current motor 23 to the positive terminal 24 and the negative terminal 25 of the direct current supply. The switching elements are in the drawing shown as transistors but could, of course, be combinations of thyristors or other elements. A diode 27 is placed in anti-parallel over each transistor to take care of reactive currents at the switching off of the transistor. To control the inverter, control signals are supplied from outputs 11–16 on a controller 10 as shown in FIG. 5. These control signals are supplied via amplifiers 26 to the base of respective transistor. Controller 10 is provided with inputs, 17, 18 through which the direct current in conduit 24 is sensed. Controller 10 is further provided with an output 39 and inputs 19, 20, 21. Output 39 is only used if it during operation is desired to change the direction of rotation of the motor. The direction of rotation is selected by applying a logigal signal to input 21. If rotation in only one direction is desired input 21 is connected either to a positive voltage or common. The speed of motor 23 may be changed by variation of a voltage applied to input 19. Input 20 is intended for receiving a start/stop signal by which rotation or no rotation is chosen.

Controller 10, which is shown in greater detail in FIG. 5, comprises a sensing means 40 for sensing the direct current in conduit 24. This current is present as a voltage between inputs 17 and 18. The output signal of sensing means 40 is applied to a first peak detector 41, a low-pass filter 42, a second peak detector 43 and a comparator 49. Peak detectors 41 and 43 comprise diodes to react on positive and negative signals respectively. The peak detectors also comprise low-pass filters. First peak detector 41 preferably has a time constant of about $4/f$ where f is the maximum fundamental frequency of the current supplied to motor 23. The cut-off frequency, $-3dB$, of peak detector 41 is preferably about $0.1\,f$. Low-pass filter 42 preferably has about the same cut-off frequency. Second peak detector 43 preferably has a time constant of about $1/f$ and a cut-off frequency of about $0.5\,f$.

Figure 6:
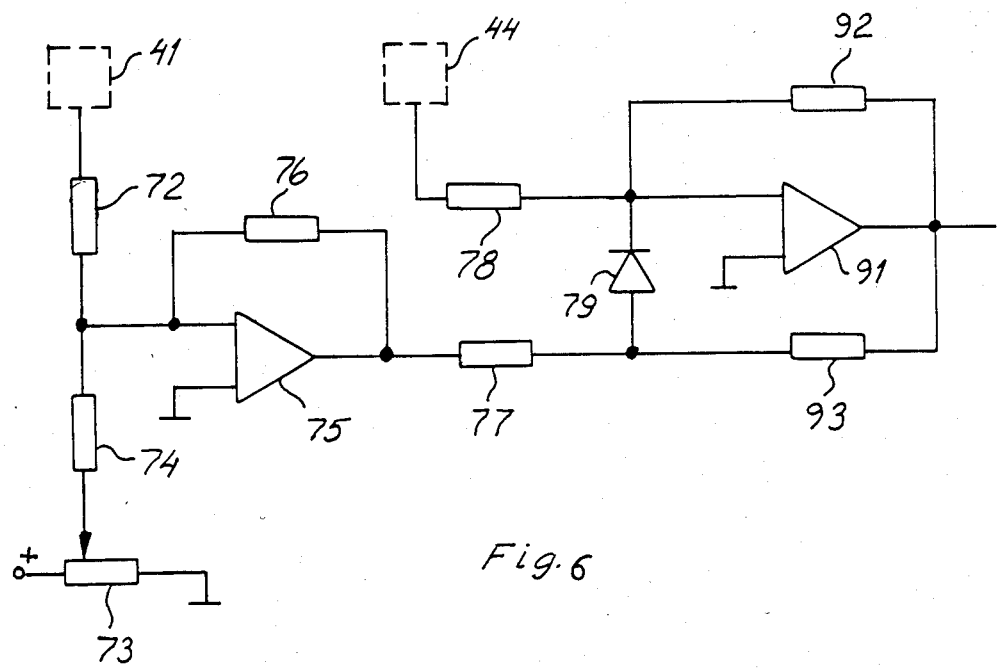
FIG. 6 shows a regulator of FIG. 5

The peak value signal from peak detector 41 is supplied to a first regulator 45, which is shown more in detail in FIG. 6. Input signals from inputs 19 and 20 are supplied to a means 44 in form of a ramp generator. Ramp generator 44 comprises one or two operational amplifiers connected as intergrators to supply regulator 45 an increasing ramp voltage at motor start acceleration and a decreasing ramp voltage at motor stop deceleration. In this way it is possible to avoid that the normal speed maximum load current is exceeded when the motor is started or stopped. A change in the speed demand signal at input 19 is also integrated by ramp generator 44. Thus it takes some time before the output of ramp generator 44 becomes fully adapted to the input signals.

Figure 7:
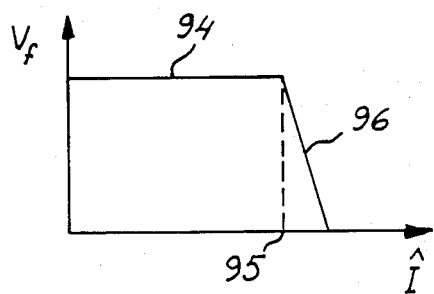
FIG. 7 illustrates a transfer function for the regulator according to FIG. 6.

The peak value signal from first peak detector 41 is applied to one of the inputs of operational amplifier 75 via resistor 72. This signal is compared with a reference signal preset on variable resistor 73 and fed to the amplifier via resistor 74. The amplifier is provided with a feed-back resistor 76. The output signal of amplifier 75 is via a resistor 77 applied to diode 79. The output signal from ramp generator 44 is via resistor 78 supplied to one of the inputs of operational amplifier 91. Amplifier 91 is provided with a first feed-back resistor 92 and a second feed-back resistor 93 in series with diode 79. Resistor 93 has a much lower resistance than resistor 92. Preferably the ratio is about 1/20. If the output signal from amplifier 75, measured at diode 79, is more negative than the output signal from amplifier 91, measured at diode 79, is positive, diode 79 is reverse-biased. The closed loop amplification of amplifier 91 is then high. Regulator 45 then operates according to line 94 in FIG. 7, assuming constant signal from ramp generator 44. If the signal from first peak detector 41 increases, the output signal from amplifier 75 becomes less negative and at a certain signal level, level 95 in FIG. 7, which is preset on resistor 73, diode 79 becomes forward-biased. The closed loop amplification of amplifier 91 is now drastically reduced so that first regulator 45 delivers a frequency controlling signal according to line 96 in FIG. 7. This signal becomes zero at about 120% of the signal at level 95. The frequency controlling signal from the output of amplifier 91 is delivered to a voltage-controlled oscillator 47, output 39 and an analog divider 46, e.g. Analog Devices AD 534. The voltage-controlled oscillator produces an output the frequency of which is proportional to the input voltage.

The rectified mean value signal obtained from low-pass filter 42 corresponds to the power supplied to motor 23, because the voltage of the direct current supply 24, 25 is substantially constant. This signal is supplied to divider 46 where it is divided with the frequency controlling signal, which is the demand signal for rotational speed of motor 23. The output signal of divider 46 will thus correspond to the torque demand from motor 23. This output signal, first voltage controlling signal, is supplied to a second regulator 48. The negative peak value signal, second voltage controlling signal, obtained from second peak detector 43 is also supplied to regulator 48 so that the output signal of regulator 48 becomes proportional to the difference between the first and the second voltage controlling signals. The negative peak value signal from peak detector 43 corresponds to the degree of magnetization of motor 23. This signal is obtained from negative pulses which are fed back to the direct current source when the transistors 31-36 are switched off. By controlling the level of these negative pulses it is possible to obtain a predetermined level of magnetization of the motor allowing both a high power to weight ratio and the avoiding of oversaturation, which would give unacceptable losses.

If the signal from sensing means 40 exceeds a predetermined level the output of comparator 49 becomes low. As a result outputs 12, 14 and 16 of AND gates 82, 84, and 86 respectively will be low. This means that the lower transistors 32, 34 and 36 of the inverter will be turned off so that the motor terminals 28, 29 and 30 will be cut off from the negative terminal 25 of the direct current supply. This cutting off thus functions as transient current protection for the inverter.

The output signal from voltage-controlled oscillator 47 is supplied to a timer 51, preferably an industrial timer of standard type 555, and to a divider 50. Divider 50 is preferably a progammable counter which delivers a pulse train having a frequency which is equal to the frequency of the input signal divided by a chosen constant. Timer 51 delivers a pulse train whose frequency is equal to the frequency of the output signal from voltage-controlled oscillator 47. The pulse width is controlled by the output signal from second regulator 48. This pulse train is supplied to AND gates 81, 83 and 85. The pulse train from divider 50 is supplied as clock signal to ring counter 52. In the ring counter a 1 and five 0's are stored. The 1 is shifted around by the pulse train from output 53 through 58 and back to 53. This makes one period of the fundamental frequency of the current supplied to motor 23. Outputs 53-58 of ring counter 52 are decoded by OR gates 59, 60 and 61. The output of each of these gates is high half the time and low half the time. A logic signal inverter 62 and NAND gates 63-68 are provided for selecting direction of rotation of motor 23. The output signals of gates 59, 60 and 61 are supplied to AND gates 81-86 for controlling the actuation of switching transistors 31-36 in the inverter. The input of gates 82, 84 and 86 are provided with logic signal inverters 71, 70 and 69, respectively.

Because the pulse width of the pulses leaving timer 51 remains constant independent of frequency if the signal from regulator 48 is constant, the mean value over half a period of the fundamental frequency of the voltage applied to any of the motor terminals will change simultaneously with the frequency as required by basic electromagnetic laws. Additional control of the means value voltage is obtained by variation of the pulse width, which is controlled by regulator 48.

As previously mentioned, the risk of overheating a tool according to the invention is considerably reduced as a result of the frequency adjustment. In spite of that, there is still a certain risk that the temperature of the motor would rise to an unacceptable level when frequently overloading the tool. In order to prevent the motor from burning, one or more heat sensors may be attached to the motor windings and arranged to produce a signal in response to a predetermined temperature being reached. This signal is preferably used to directly cause a power supply interruption and/or an optical signal to inform of overheating.

We claim:

1. Method for energizing a manually supported portable power tool which includes a brushless electric motor (23) which is coupled with a variable voltage and frequency electrical inverter which in turn is coupled with a DC power supply means (22) and which supplies AC electric power to the motor (23), comprising the steps of:
   sensing continuously the output current magnitude of said DC power supply means, which current magnitude is indicative of the torque load applied on the motor as well as the motor slip;
   adjusting continuously for AC output voltage of said inverter in response to the magnitude of the torque load indicated by said sensed DC current output of said DC power supply means for minimizing the motor slip when increasing the motor load from zero to the maximum level; and
   continuously controlling the frequency of the AC output voltage of said inverter as a function of the motor speed indicated by the sensed DC current output of said DC power supply means for maintaining the frequency at a constant level during motor load variations between zero and the maximum level and for matching the frequency to the motor speed indicated by said sensed DC current output of said DC power supply means at motor speeds below the motor speed indicated at the maximum motor load level to prevent stalling of the motor.

2. The method of claim 1, wherein said step of adjusting comprises increasing the amplitude of the average output voltage of said inverter at least twice as the motor torque load grows from the idle condition to a maximum torque load condition.

3. The method of claim 1, wherein said step of adjusting comprises increasing the amplitude of the average output voltage of said inverter at least 20% above a normal value thereof torque load is reached.

4. The method of claim 2, wherein said step of adjusting comprises increasing the amplitude of the average output voltage of said inverter at least 20% above a normal value thereof for continuous maximum motor power output as the maximum motor for continuous maximum motor power output as the maximum motor torque load is reached.

5. The method of claim 1, wherein under peak motor torque load conditions, said step of continuously controlling comprises controlling the frequency of said AC output voltage as a function of decreasing motor speed to maintain maximum motor output torque load.

6. A portable manually supported power tool including a brushless electric motor (23) and being coupled with a variable voltage and frequency electrical inverter which is coupled with a DC power supply means (22) and which supplies AC electric power to the motor (23), the tool comprising:
   a current sensing means (40) for sensing continuously the output current magnitude of said DC power supply means, which current magnitude is indicative of the torque load applied on the motor (23) as well as the motor slip;
   a voltage control means for continuously adjusting the AC output voltage of said inverter in response to the magnitude of the torque load indicated by said DC current sensing means (40) for minimizing the motor slip when increasing the motor load from zero to the maximum level; and a frequency control means for continuously controlling the frequency of the AC output voltage of said inverter as a function of the motor speed indicated by said DC current sensing means for maintaining the frequency at a constant level during motor load variations between zero and the maximum level and for matching the frequency to the motor speed indicated by said DC current sensing means at motor speeds below the motor speed indicated at the maximum motor load level to prevent stalling of the motor.

7. The portable power tool of claim 6, wherein said current sensing means comprises a comparator.

8. The portable power tool of claim 7, wherein said inverter comprises a plurality of inverter switches, and wherein said voltage control means comprises a pulse width modulator coupled at an input thereof to said current sensing means and at an output thereof of said inverter switches of said inverter for adjusting the pulse width of the output of said inverter, thereby adjusting the AC output voltage of said inverter.

9. The portable power tool of claim 8, wherein said inverter is an electonic inverter having a plurality of electronic inverter switches.

10. The portable power tool of claim 6, wherein said inverter forms a unit with the portable power tool itself.

11. The portable power tool of claim 6, wherein said voltage control means includes means for increasing the amplitude of the average output voltage of said inverter means at least 20% above a normal value thereof for continuous maximum motor power output as the maximum motor torque load is reached.

12. The portable power tool of claim 8, wherein said voltage control means includes means for increasing the amplitude of the average output voltage of said inverter means at least 20% above a normal value thereof for continuous maximum motor power output as the maximum motor torque load is reached.

13. The portable power tool of claim 6, wherein said frequency control means includes means for continuously controlling the frequency of said inverter means as a function of decreasing motor speed to maintain maximum motor output torque load.

* * * * *

UNITED STATES PATENT AND TRADEMARK OFFICE
CERTIFICATE OF CORRECTION

PATENT NO. : 4,489,261
DATED : December 18, 1984
INVENTOR(S) : C. Sverker M. HARTWIG, et al It is certified that error appears in the above-identified patent and that said Letters Patent is hereby corrected as shown below:

COLUMN 8 (claim 3), line 39, after "normal value thereof" insert --for continuous maximum motor power output as the maximum motor--;

COLUMN 9 (claim 8), line 20, after "an output thereof" change "of said" to --to said--.

Signed and Sealed this

Fourteenth Day of May 1985

[SEAL]

Attest:

DONALD J. QUIGG

*Attesting Officer*  *Acting Commissioner of Patents and Trademarks*

UNITED STATES PATENT AND TRADEMARK OFFICE
CERTIFICATE OF CORRECTION

PATENT NO. : 4,489,261

DATED : December 18, 1984

INVENTOR(S) : HARTWIG et al

It is certified that error appears in the above-identified patent and that said Letters Patent is hereby corrected as shown below:

Column 8, line 44, delete "as the maximum motor for continuous maximum motor power output"

Signed and Sealed this

Sixth Day of August 1985

[SEAL]

Attest:

DONALD J. QUIGG

*Attesting Officer*   *Acting Commissioner of Patents and Trademarks*